US012623582B2

(12) United States Patent
Kim et al.

(10) Patent No.: US 12,623,582 B2
(45) Date of Patent: May 12, 2026

(54) LOCKING APPARATUS FOR VEHICLE SEAT

(71) Applicants: Hyundai Motor Company, Seoul (KR); Kia Corporation, Seoul (KR); Hyundai Transys Inc., Seosan-si (KR)

(72) Inventors: Eun Sue Kim, Hwaseong-si (KR); Dae Hee Lee, Incheon (KR); Sang Hark Lee, Incheon (KR); Ji Yun Ha, Suwon-si (KR); Jun Hyung Kwon, Hwaseong-si (KR); Duk Kyu Byun, Hwaseong-si (KR); Sin Jung Kang, Hwaseong-si (KR); Seong Bin Jung, Hwaseong-si (KR)

(73) Assignees: Hyundai Motor Company, Seoul (KR); Kia Corporation, Seoul (KR); Hyundai Transys Inc., Seosan-si (KR)

( * ) Notice: Subject to any disclaimer, the term of this patent is extended or adjusted under 35 U.S.C. 154(b) by 167 days.

(21) Appl. No.: 18/610,560

(22) Filed: Mar. 20, 2024

(65) Prior Publication Data

US 2025/0187512 A1     Jun. 12, 2025

(30) Foreign Application Priority Data

Dec. 11, 2023   (KR) ........................ 10-2023-0178912

(51) Int. Cl.
| | |
|---|---|
| *B60N 2/30* | (2006.01) |
| *B60N 2/20* | (2006.01) |
| *B60N 2/90* | (2018.01) |
| *A47C 9/06* | (2006.01) |

(Continued)

(52) U.S. Cl.
CPC .............. *B60N 2/933* (2018.02); *B60N 2/20* (2013.01); *A47C 9/06* (2013.01); *B60N 2/304* (2013.01); *B60N 2/3043* (2013.01); *B60N*

*2/753* (2018.02); *B60N 2002/971* (2018.02); *B64D 11/0691* (2014.12); *B64D 11/0698* (2014.12)

(58) Field of Classification Search
CPC .... B60N 2/304; B60N 2/3047; B60N 2/3004; B60N 2/3009; B60N 2/3027; B60N 2/933; B60N 2/938; B60N 2/753; B60N 2/767; B60N 2/3043; B60N 2/3052; B60N 2/3061; B60N 2/22; B60N 2/20; A47C 9/06; B64D 11/0691; B64D 11/0698
See application file for complete search history.

(56) References Cited

U.S. PATENT DOCUMENTS

| | | | |
|---|---|---|---|
| 7,712,829 B2 * | 5/2010 | Park ........................ | B60N 2/065 296/65.13 |
| 2021/0061144 A1 * | 3/2021 | Madhu ................... | B60N 2/305 |

FOREIGN PATENT DOCUMENTS

| | | |
|---|---|---|
| KR | 20180009411 A | 1/2018 |
| KR | 20210058476 A | 5/2021 |

* cited by examiner

*Primary Examiner* — Syed A Islam
(74) *Attorney, Agent, or Firm* — Slater Matsil, LLP

(57) ABSTRACT

An embodiment locking apparatus for a seat includes a side frame rotatably coupled to a rear end of a cushion part and having an arc-shaped slot hole disposed thereon along a turning radius of the cushion part, a locking protrusion disposed on the cushion part, fitted into the slot hole, and configured to move along the slot hole in a state in which the cushion part is rotated to be changed to a seating mode or a tip-up mode, and a latch rotatably coupled to the side frame and configured to be locked and fixed by the locking protrusion in a state in which the cushion part is in the seating mode or the tip-up mode.

20 Claims, 19 Drawing Sheets

(51) Int. Cl.
    *B60N 2/75*         (2018.01)
    *B64D 11/06*      (2006.01)

520,530

522,532

521,531

LOCKING APPARATUS FOR VEHICLE SEAT

CROSS-REFERENCE TO RELATED APPLICATIONS

This application claims the benefit of Korean Patent Application No. 10-2023-0178912, filed on Dec. 11, 2023, which application is hereby incorporated herein by this reference.

TECHNICAL FIELD

The present disclosure relates to a locking apparatus for a vehicle seat.

BACKGROUND

In a vehicle, a seat on which a passenger can be seated is provided.

A vehicle seat is normally provided with a cushion part configured to support the lower body of the passenger and a back part configured to support the upper body of the passenger.

As a scheme for increasing usability of an indoor space in a limited space of a vehicle, there is a technology to adopt a seat on which a cushion part is tipped up.

The seat on which the cushion part is tipped up has a structure in which a rear end of the cushion part is rotatable up and down with respect to a lower end of the back part, and in a state where the cushion part is rotated to protrude forward, a passenger can be seated on the cushion part, and this state may be defined as a seating mode.

Further, in a state where the cushion part is rotated toward the back part and is in an upright position, the usability of the indoor space is increased and a moving passage can be secured, and this state may be defined as a tip-up mode.

Meanwhile, the seat in the cushion part tip-up structure requires a locking device for fixing the location of the cushion part in the seating mode and in the tip-up mode.

The seat in the general cushion part tip-up structure is provided with a locking device in the seating mode and a locking device in the tip-up mode, and thus a technology to simplify the locking devices is needed.

The foregoing description of the background technology is intended merely to help the understanding of the background of embodiments of the present disclosure and is not intended to mean that the present disclosure falls within the purview of the related art that is already publicly known.

SUMMARY

The present disclosure relates to a locking apparatus for a vehicle seat. Particular embodiments relate to a locking apparatus for a vehicle seat that can lock a cushion part in a seating mode and in a tip-up mode by utilizing a bi-directionally lockable latch.

Embodiments of the present disclosure provide a locking apparatus for a vehicle seat that can lock all of a cushion part in a seating mode and a cushion part in a tip-up mode by utilizing a bi-directionally lockable latch on a seat of a cushion part tip-up structure, and an embodiment of the present disclosure provides reduction of the number of components, weight reduction, and cost reduction of the locking apparatus.

A locking apparatus for a vehicle seat according to embodiments of the present disclosure includes a side frame rotatably coupled to a rear end of a cushion part and having an arc-shaped slot hole formed thereon along a turning radius of the cushion part, a locking protrusion provided on the cushion part, fitted into the slot hole when the cushion part is rotated to be changed to a seating mode or a tip-up mode, and a latch rotatably coupled to the side frame and configured to be locked and fixed by the locking protrusion when the cushion part is in the seating mode or in the tip-up mode.

The latch includes one component, and the locking protrusion is configured to be locked in and fixed to one end of the latch when the cushion part is in the seating mode and to be locked in and fixed to the other end of the latch when the cushion part is in the tip-up mode.

The latch includes a body part rotatably coupled to a latch fixing part provided on the side frame, a first extension part extending in one direction from the body part and having an end part on which a first latch groove for fixing the locking protrusion is formed, and a second extension part extending in the other direction from the body part and having an end part on which a second latch groove for fixing the locking protrusion is formed.

The body part is rotatably coupled to the side frame around the latch fixing part between one end and the other end of the slot hole, and the first latch groove and the second latch groove are installed to match the one end and the other end of the slot hole, respectively.

When the cushion part is in the seating mode, the locking protrusion is fitted and fixed into the first latch groove in a state where the locking protrusion is located at one end of the slot hole.

When the cushion part is in the tip-up mode, the locking protrusion is fitted and fixed into the second latch groove in a state where the locking protrusion is located at the other end of the slot hole.

An outer surface of the first latch groove is formed as a first inclined surface, and when the locking protrusion moves to one end of the slot hole, the locking protrusion moves over the first inclined surface and is fitted into the first latch groove.

An outer surface of the second latch groove is formed as a second inclined surface, and when the locking protrusion moves to the other end of the slot hole, the locking protrusion moves over the second inclined surface and is fitted into the second latch groove.

The locking apparatus further includes a latch handle rotatably coupled to the cushion part and a latch cable configured to connect the latch handle and the latch to each other and configured to rotate the latch by a pulling force as the latch cable is pulled toward the latch handle when a user rotates the latch handle.

The locking apparatus further includes a latch spring configured to connect the latch and the side frame to each other, to accumulate an elastic force when the latch is rotated by the pulling force of the latch cable, and to return the latch by the accumulated elastic force when the pulling force of the latch cable is released.

The latch is formed in a straight shape and has one end and the other end at which a first latch groove and a second latch groove for inserting the locking protrusion therein are formed to be open in the same direction, the locking protrusion is fitted and fixed into the first latch groove in a state where the locking protrusion is located at one end of the slot hole when the cushion part is in the seating mode, and the locking protrusion is fitted and fixed into the second latch groove in a state where the locking protrusion is located at the other end of the slot hole when the cushion part is in the tip-up mode.

On the latch, one end of a latch cable and one end of a latch spring are connected to each other in opposite directions, the other end of the latch cable is connected to a latch handle coupled to the cushion part, the other end of the latch spring is connected to the side frame, and if the latch cable is pulled through a rotation of the latch handle by a user operation, the straight-shaped latch moves in a straight line in a pulling direction of the latch cable whereas if a user operation force is released from the latch handle, the latch moves in a straight line in an opposite direction by an elastic force of the latch spring and returns to an initial location.

The locking apparatus for a vehicle seat according to embodiments of the present disclosure is configured to be able to lock all of the cushion part in the seating mode and the cushion part in the tip-up mode by utilizing the bi-directionally lockable latch on the seat of the cushion part tip-up structure, and through this, it is possible to seek the reduction of the number of components, the weight reduction, and the cost reduction of the locking apparatus.

BRIEF DESCRIPTION OF THE DRAWINGS

The above and other objects, features, and advantages of embodiments of the present disclosure will be more clearly understood from the following detailed description taken in conjunction with the accompanying drawings, in which.

DETAILED DESCRIPTION OF ILLUSTRATIVE EMBODIMENTS

Figure 1:
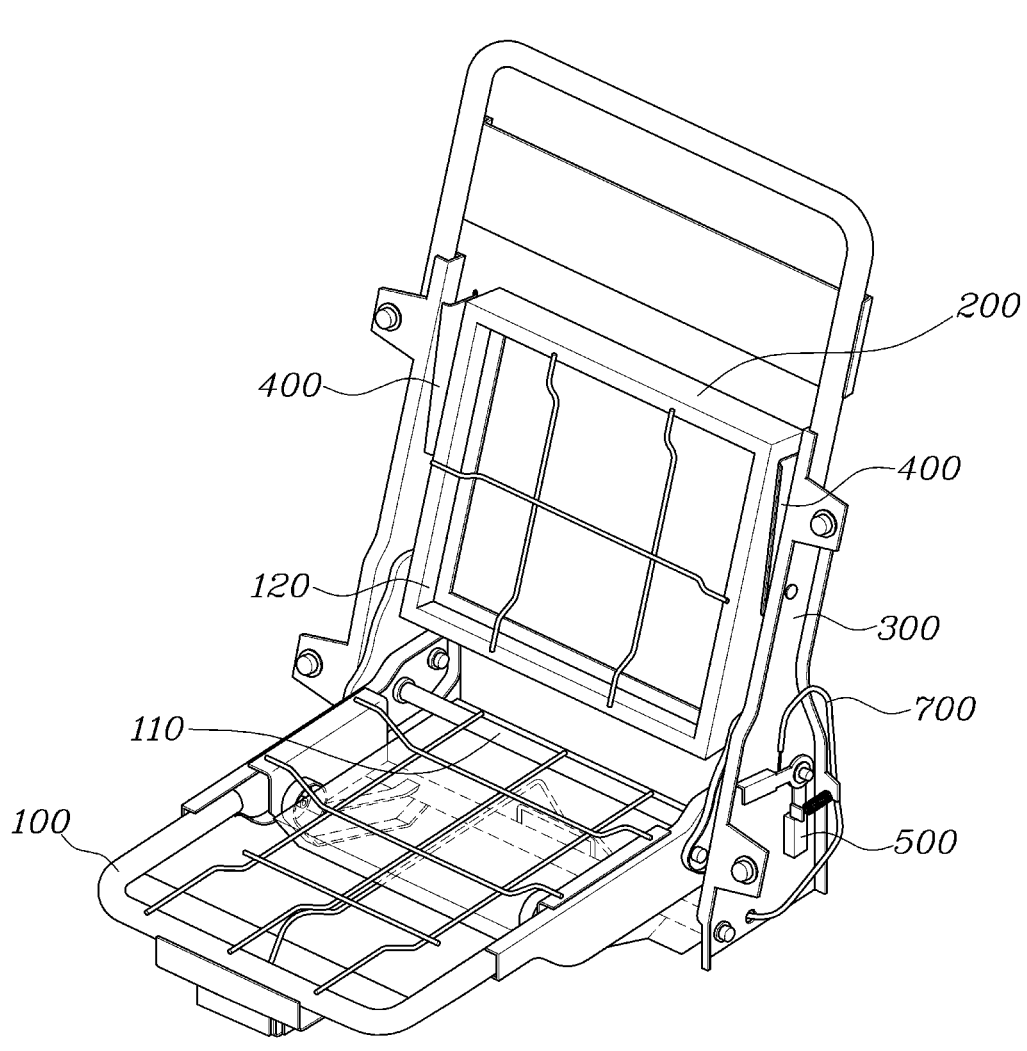
FIG. 1 is a view explaining a seat locking apparatus in a seating mode according to embodiments of the present disclosure.

Hereinafter, embodiments disclosed in the description will be described in detail with reference to the accompanying drawings, and the same reference numerals are given to the same or similar constituent elements regardless of the figure number, and the duplicate explanation thereof will be omitted.

Suffixes "module" and "part" for constituent elements as used in the following description are given or used interchangeably in consideration of only easiness of preparation of the description and do not have distinguishable meanings or roles by themselves.

In explaining embodiments disclosed in the present specification, if it is determined that the detailed explanation of a related known technology may obscure the gist of the embodiments disclosed in the present specification, the detailed explanation will be omitted.

Further, the accompanying drawings are merely to easily understand the embodiments disclosed in the present specification, and it should be understood that the technical idea disclosed in the present specification is not limited by the accompanying drawings, but includes all changes, equivalents, and substitutes included in the idea and technical scope of the present disclosure.

The terms including ordinal numbers, such as "first," "second," and the like, may be used to describe diverse constituent elements, but the constituent elements should not be limited by the terms. The terms are only for the purpose of discriminating one constituent element from another constituent element.

It should be understood that if a certain constituent element is mentioned to be "connected" or "coupled" to another constituent element, it should be understood that the certain constituent element is directly connected or coupled to the other constituent element and/or still another constituent element may exist in the middle.

In contrast, if a certain constituent element is mentioned to be "directly connected" or "directly coupled" to another constituent element, it should be understood that the still another constituent element does not exist in the middle.

A singular expression includes a plural expression unless clearly defined in a different manner in context.

In the present specification, it should be understood that the term "include" or "have" specifies the presence of stated features, numerals, steps, operations, constituent elements, parts, or a combination thereof, but it does not preclude the possibility of the presence or addition of one or more other features, numerals, steps, operations, constituent elements, parts, or a combination thereof.

Further, "unit" or "control unit" included in names, such as a motor control unit (MCU) and a hybrid control unit (HCU), is merely a term that is widely used in naming a controller controlling a specific vehicle function, but it does not mean a generic function unit.

The controller may include a communication device communicating with another controller or a sensor to control a function in charge, a memory storing the operating system or logical instructions and input/output information, and one or more processors performing judgments, operations, and decisions required to control the function in charge.

Hereinafter, a locking apparatus for a vehicle seat according to preferred embodiments of the present disclosure will be described with reference to the accompanying drawings.

As illustrated in FIGS. 1 to 19, a seat of a cushion part tip-up structure according to embodiments of the present disclosure includes a cushion part 100 configured to support the lower body of a passenger, a back part 200 configured to support the upper body of the passenger, and a side frame 300 configured to surround an outer circumference of the back part 200 and to connect the cushion part 100 and the back part 200 to each other.

At a rear end of the cushion part 100, a hinge shaft 110 is crossly coupled in the left and right direction (width direction), and both ends of the hinge shaft 110 are coupled to the side frame 300 with a rotatable structure. Accordingly, the cushion part 100 is so structured that the front end thereof is rotatable up and down around the hinge shaft 110 at the rear end thereof.

A state where the cushion part 100 is rotated to protrude forward may be defined as a seating mode, and a state where the cushion part 100 is rotated toward the back part 200 and is in an upright position may be defined as a tip-up mode.

Figure 4:
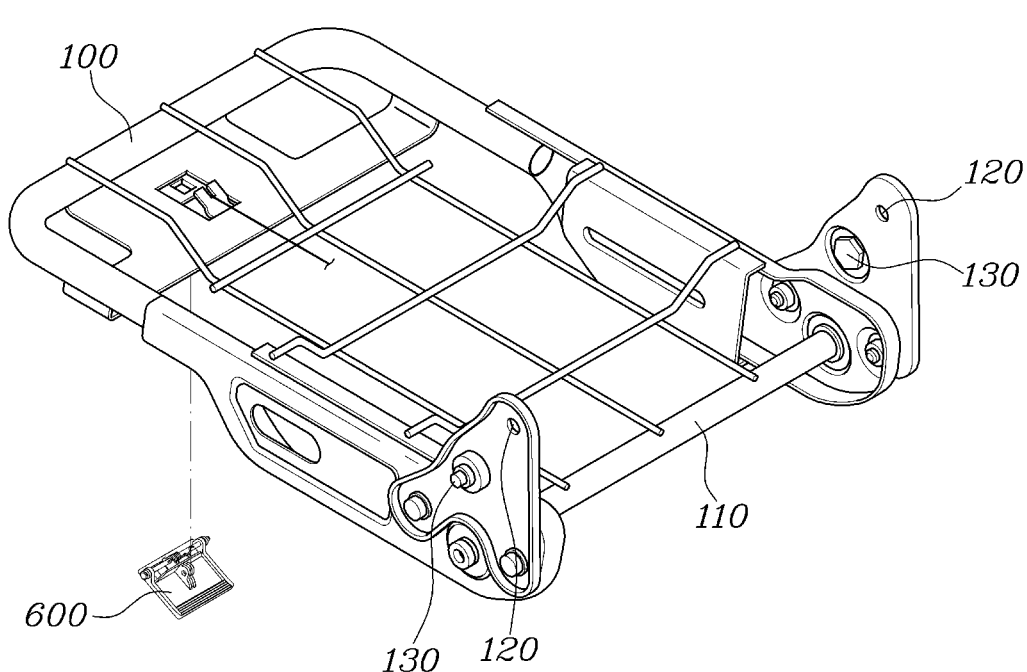
FIGS. 4 and 5 are views explaining a seat part of embodiments of the present disclosure.

Referring to FIGS. 1 and 4, on the left and right side of the rear end of the cushion part 100, a first mounting part 120 on an upper side of the hinge shaft 110 is coupled to the left and right sides of the lower end of the back part 200.

Referring to FIG. 1, on the upper side of the first mounting part 120, a link bracket 400 is positioned between the left and right sides of the back part 200 and the side frame 300, the upper end of the link bracket 400 is connected to the left and right sides of the back part 200 with a rotatable hinge structure, and the lower end of the link bracket 400 is connected to the side frame 300 with a rotatable hinge structure.

The locking apparatus according to embodiments of the present disclosure is an apparatus which can lock all of a cushion part in a seating mode and a cushion part in a tip-up mode by utilizing a bi-directionally lockable latch on a seat of a cushion part tip-up structure.

That is, the locking apparatus according to embodiments of the present disclosure may include a side frame 300 rotatably coupled to a rear end of a cushion part 100 and having an arc-shaped slot hole 310 formed thereon along a turning radius of the cushion part 100, a locking protrusion 130 provided on the cushion part 100, fitted into the slot hole 310, and configured to move along the slot hole 310 when the cushion part 100 is rotated to be changed to a seating mode or a tip-up mode, and a latch 500 rotatably coupled to the side frame 300 and configured to be locked and fixed by the locking protrusion 130 when the cushion part 100 is in the seating mode or the tip-up mode.

The cushion part 100 may be coupled to the side frame 300 with an up and down rotatable structure around the hinge shaft 110 at the rear end of the cushion part 100, and through this, the hinge shaft 110 at the rear end may be the center of rotation of the cushion part 100.

The slot hole 310 formed on the side frame 300 may be formed in an arc shape along the turning radius of the cushion part 100 centered on the hinge shaft 110.

On the left and right sides of the rear end of the cushion part 100, the locking protrusion 130 may be provided to protrude outward, the locking protrusion 130 may be constituted by a locking bolt, the end part of the locking protrusion 130 may be fitted into the slot hole 310, and the locking protrusion 130 may move along the slot hole 310 when the cushion part 100 is rotated up and down.

The latch 500 is coupled to the side frame 300 with a rotatable structure in nearby locations of the slot hole 310, and when the cushion part 100 is in the seating mode or in the tip-up mode, the locking protrusion 130 is locked and fixed thereto, and thus the latch 500 can fix the location of the cushion part 100 in the seating mode or the location of the cushion part 100 in the tip-up mode.

The latch 500 according to embodiments of the present disclosure may include one component, and the locking protrusion 130 may be configured to be locked in and fixed to one end of the latch 500 when the cushion part 100 is in the seating mode and to be locked in and fixed to the other end of the latch 500 when the cushion part 100 is in the tip-up mode.

The latch 500 may include a body part 510 rotatably coupled to a latch fixing part 320 provided on the side frame

300, a first extension part 520 extending in one direction from the body part 510 and having an end part on which a first latch groove 521 for fixing the locking protrusion 130 is formed, and a second extension part 530 extending in the other direction from the body part 510 and having an end part on which a second latch groove 531 for fixing the locking protrusion is formed.

The first extension part 520 and the second extension part 530 of the latch 500 extend to be spaced apart at a predetermined angle based on the body part 510, and the spaced angle between the first extension part 520 and the second extension part 530 may be about 90°, but it is not limited thereto.

The body part 510, the first extension part 520, and the second extension part 530 of the latch 500 may be structured to be integrally formed with one another, or the first extension part 520 formed with the first latch groove 521 and the second extension part 530 formed with the second latch groove 531 may be coupled to both ends of the body part 510, respectively, to form an integral structure with the body part 510.

The body part 510 of the latch 500 may be rotatably coupled to the side frame 300 around the latch fixing part 320 between one end and the other end of the slot hole 310, and the first latch groove 521 and the second latch groove 531 may be installed to match the one end and the other end of the slot hole 310, respectively.

Figure 6:
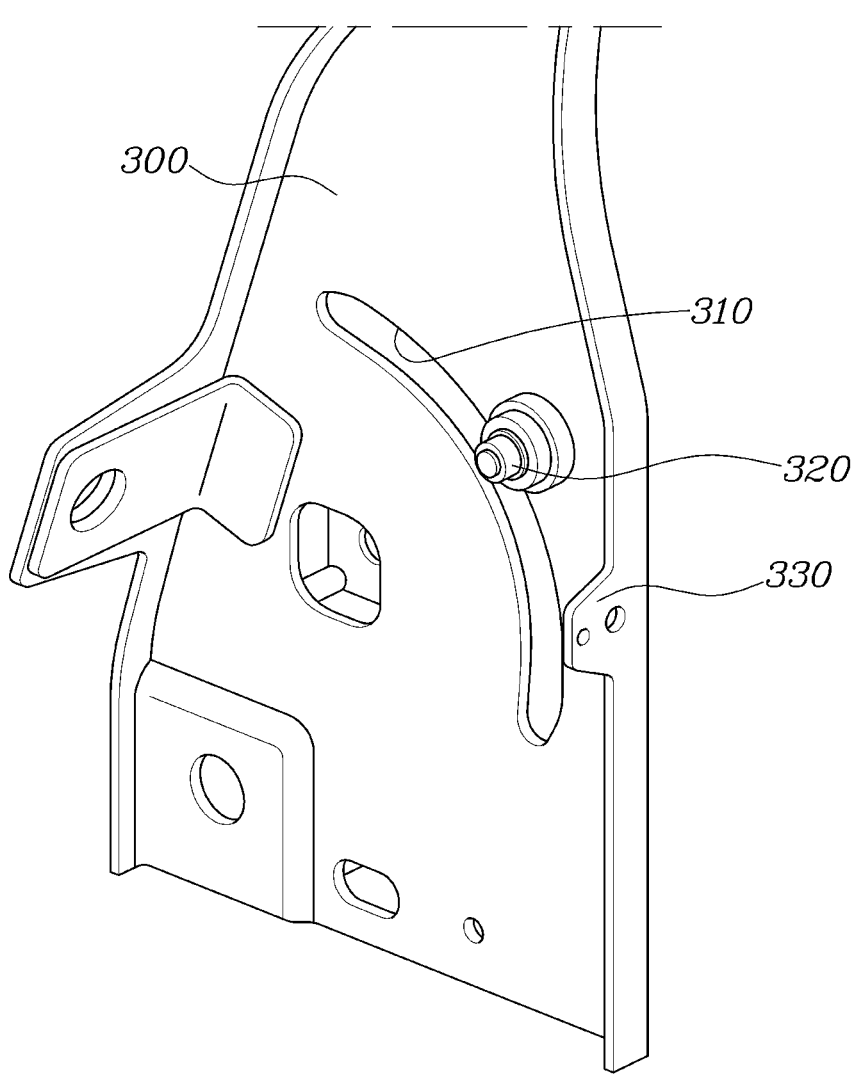
FIG. 6 is a view explaining a side frame of embodiments of the present disclosure.
Figure 7:
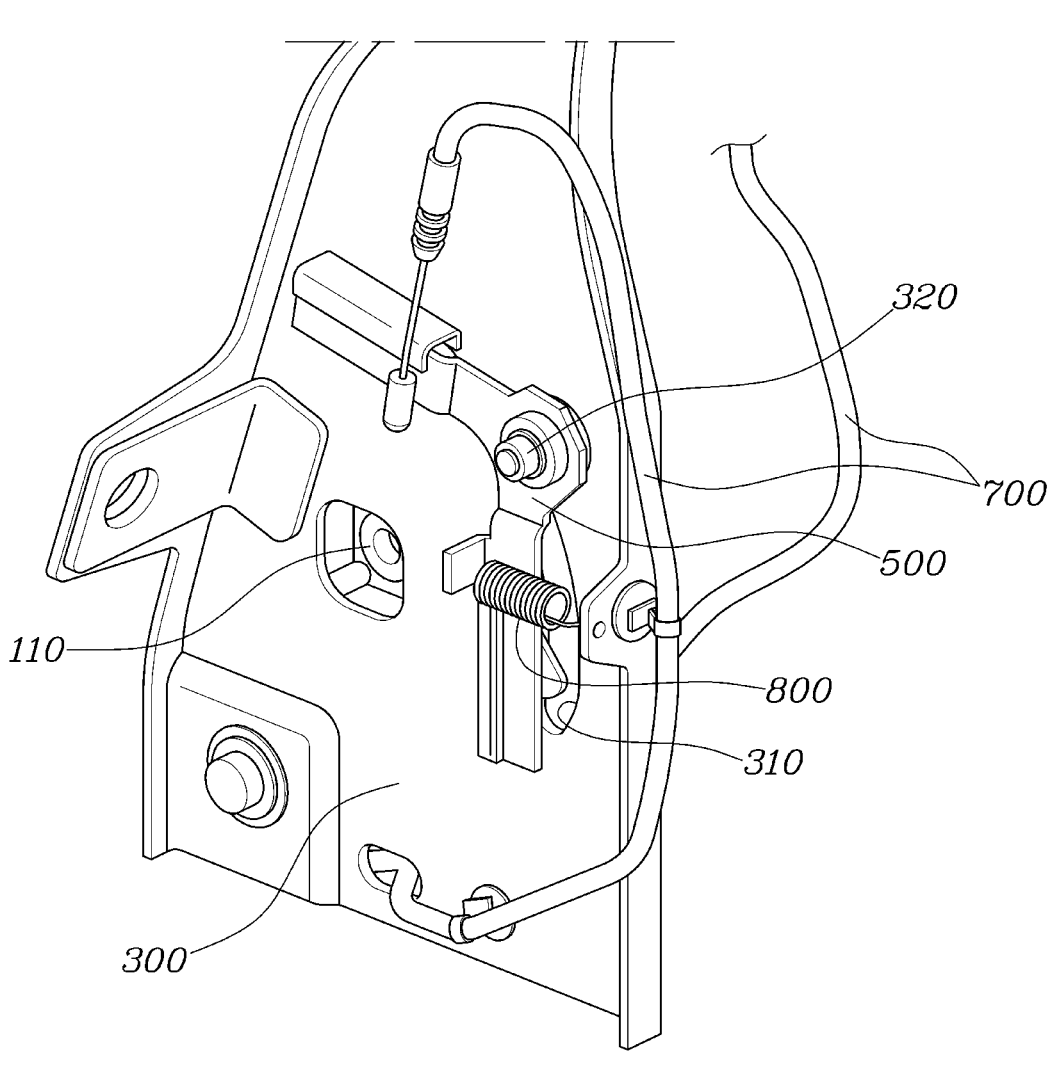
FIG. 7 is a view of a state where a latch is coupled in FIG. 6.
Figure 8:
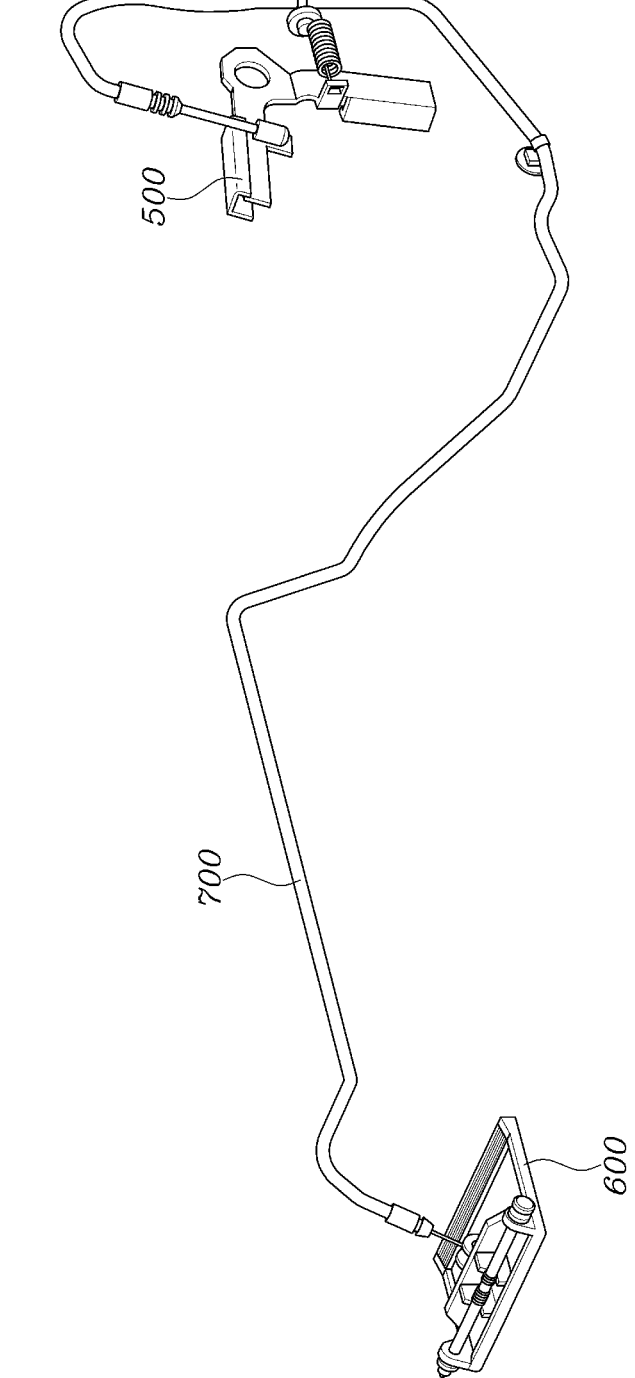
FIG. 8 is a view of a state where a latch, a latch cable, and a latch handle are connected according to embodiments of the present disclosure.
Figure 9:
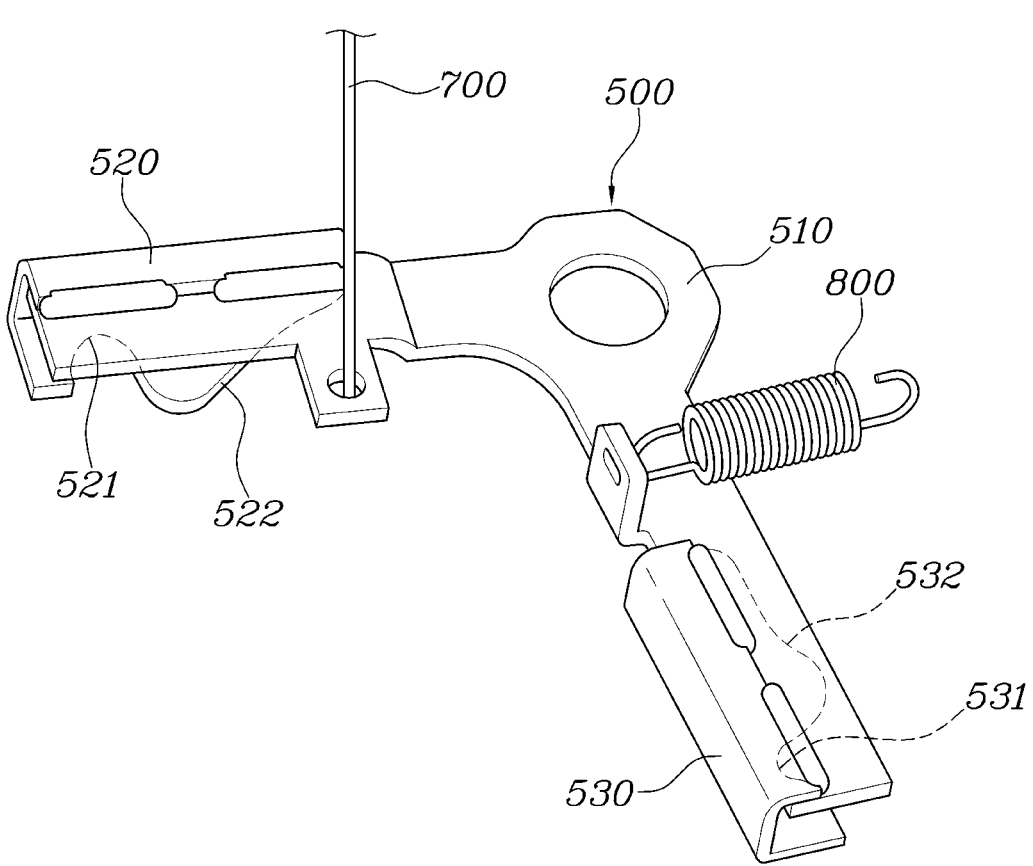
FIGS. 9 and 10 are views explaining a latch of embodiments of the present disclosure.
Figure 10:
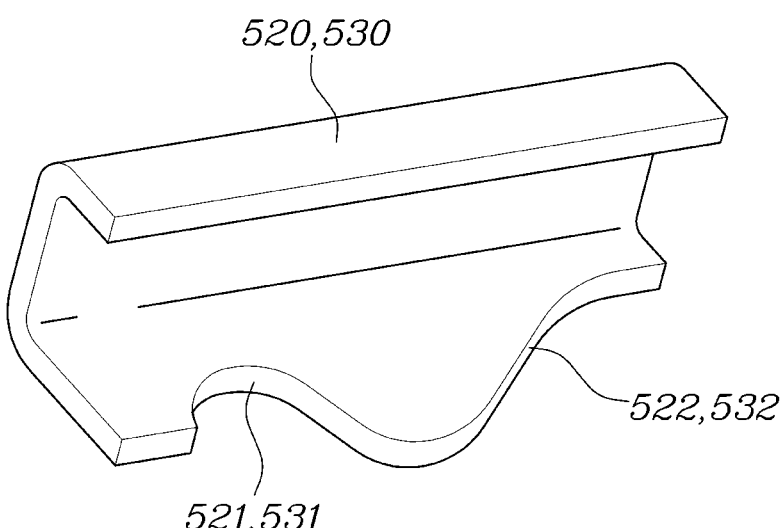

Referring to FIG. 6, the one end of the slot hole 310 may be the top end of the slot hole 310, and the other end of the slot hole 310 may be the bottom end thereof.

Figure 2:
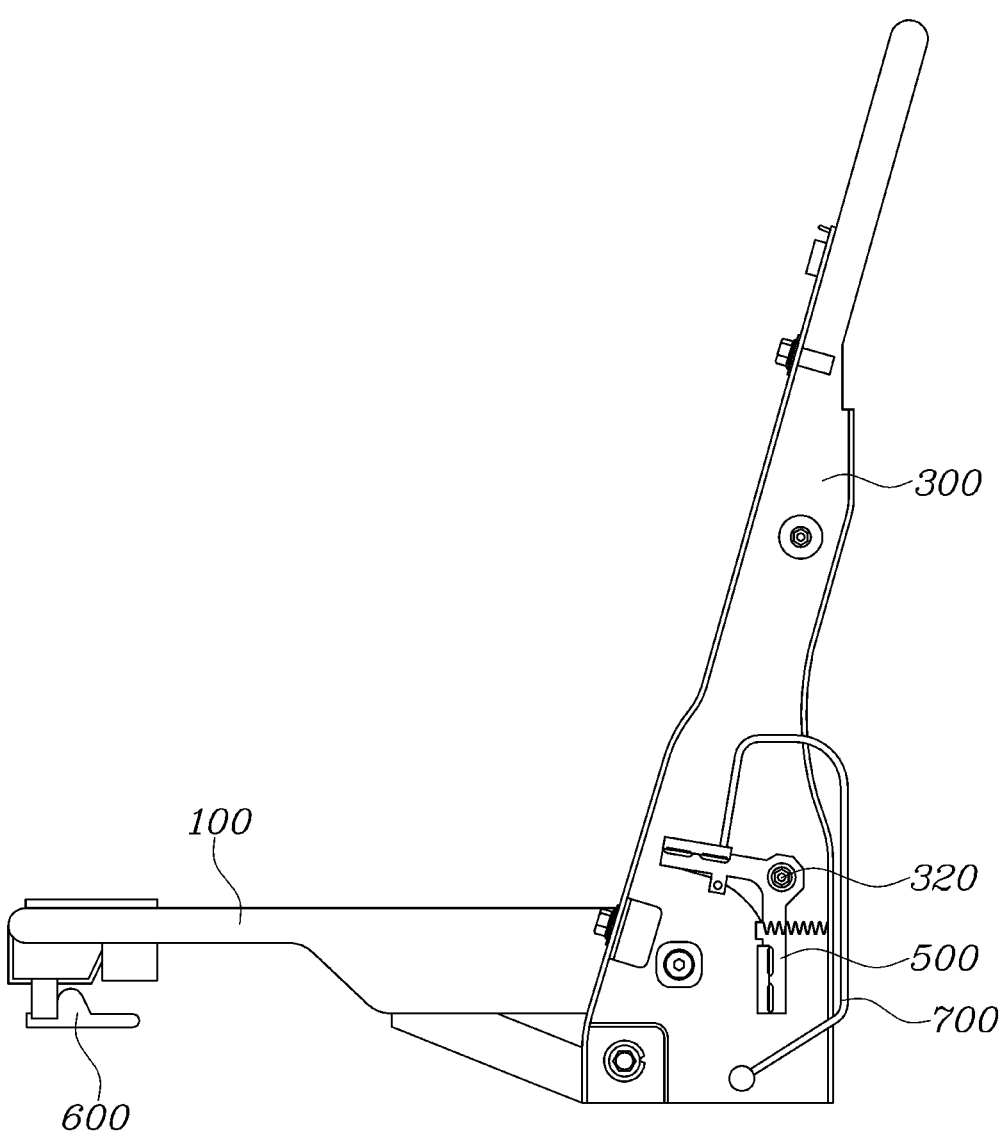
FIG. 2 is a side view of FIG. 1.
Figure 3:
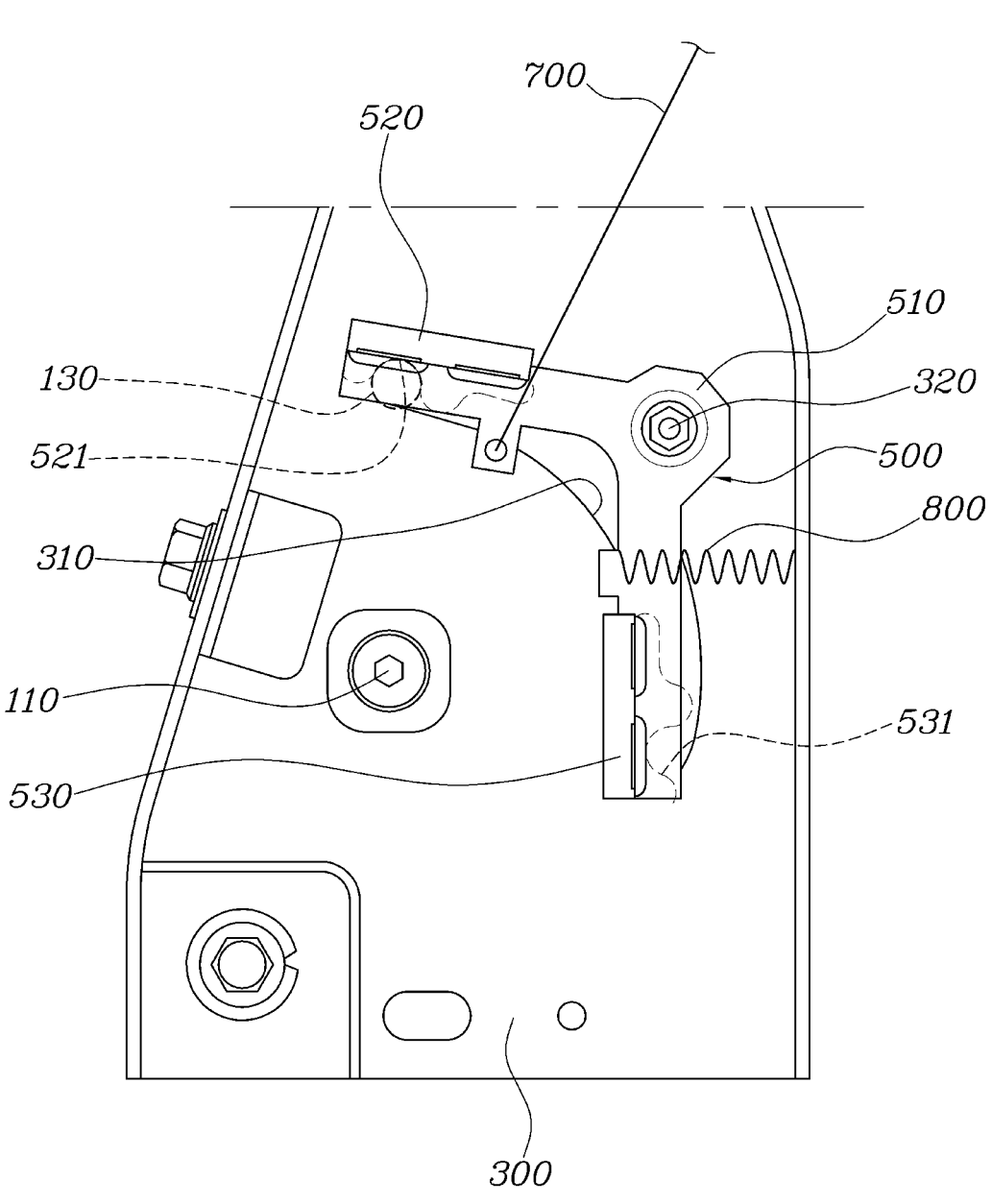
FIG. 3 is an enlarged view of a region to which a latch is coupled in FIG. 2.

Referring to FIGS. 1 to 3, when the cushion part 100 is in the seating mode, the locking protrusion 130 is fitted and fixed into the first latch groove 521 in a state where the locking protrusion 130 is located at one end of the slot hole 310, and accordingly, the location of the cushion part 100 may be fixed in the seating mode.

Figure 14:
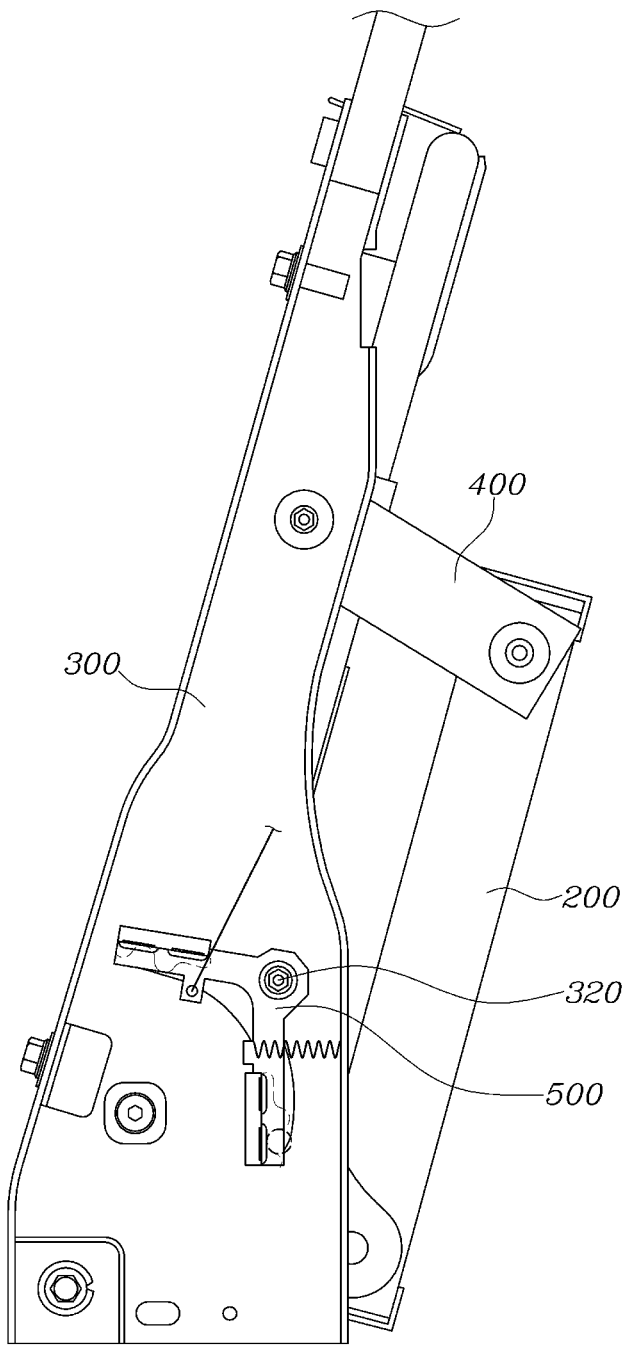
FIGS. 14 and 15 are views explaining a tip-up mode state of a cushion part.
Figure 15:
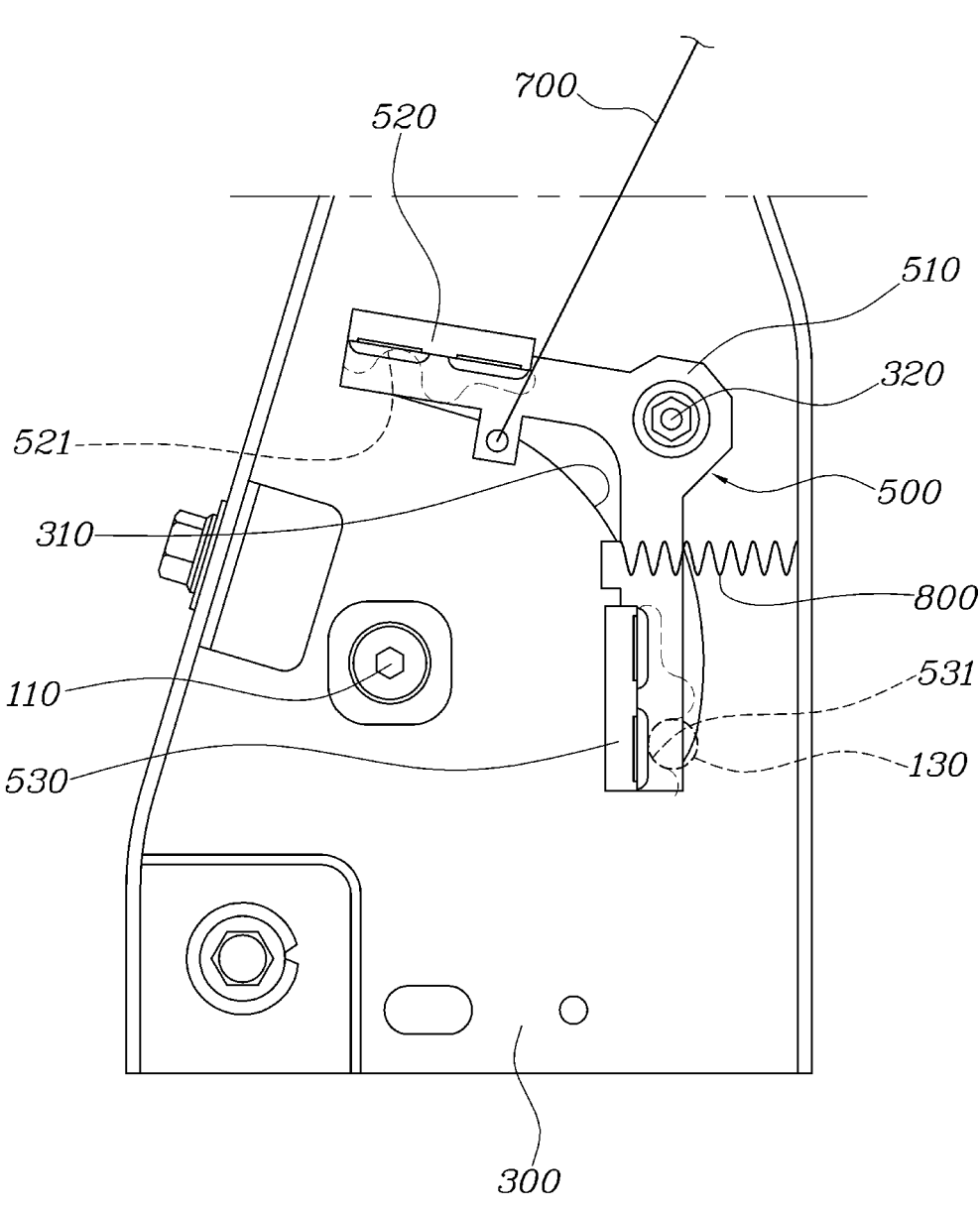

Referring to FIGS. 14 and 15, when the cushion part 100 is in the tip-up mode, the locking protrusion 130 is fitted and fixed into the second latch groove 531 in a state where the locking protrusion is located at the other end of the slot hole 310, and accordingly, the location of the cushion part 100 may be fixed in the tip-up mode.

An outer surface of the first latch groove 521 may be formed as a first inclined surface 522, and when the locking protrusion 130 moves to one end of the slot hole 310, the locking protrusion 130 may smoothly move over the first inclined surface 522 and may be fitted into the first latch groove 521.

Further, an outer surface of the second latch groove 531 may be formed as a second inclined surface 532, and when the locking protrusion 130 moves to the other end of the slot hole 310, the locking protrusion may smoothly move over the second inclined surface 532 and may be fitted into the second latch groove 531.

Figure 16:
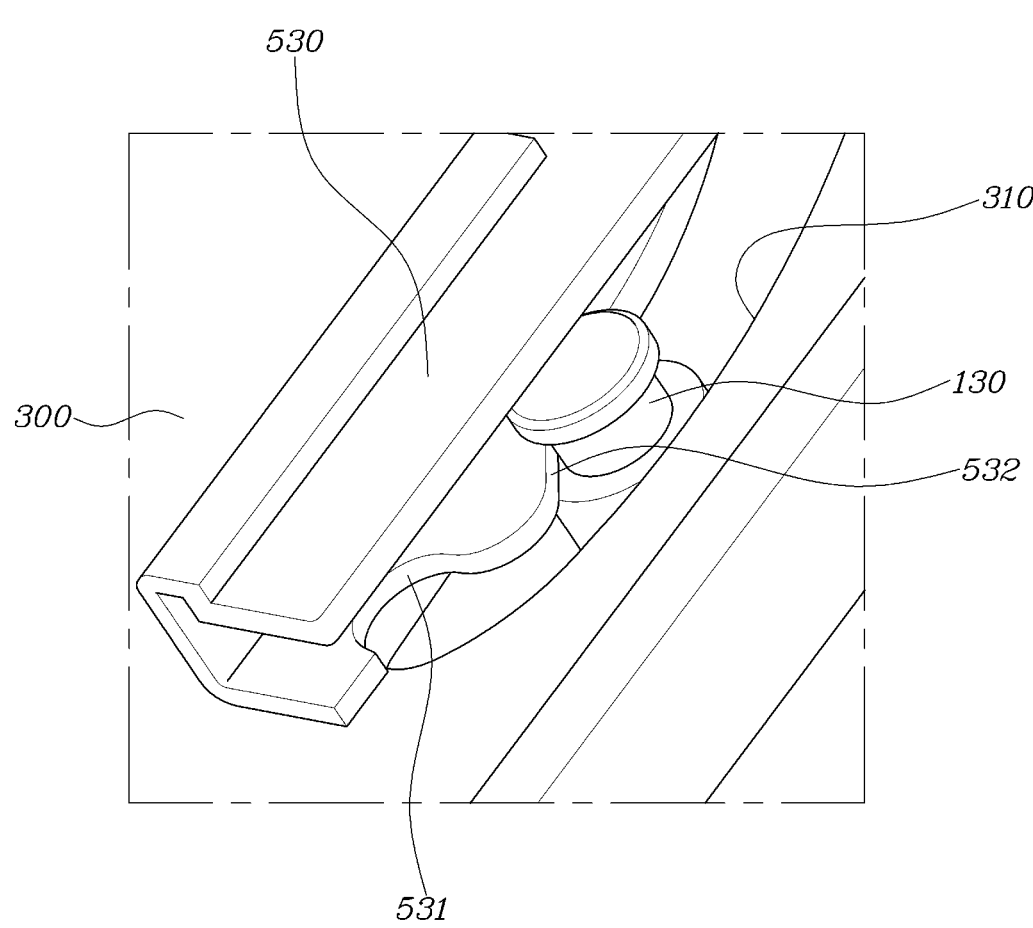
FIGS. 16 to 18 are views explaining a process in which a locking protrusion is inserted into a second latch groove when a cushion part mode is changed to a tip-up mode.
Figure 17:
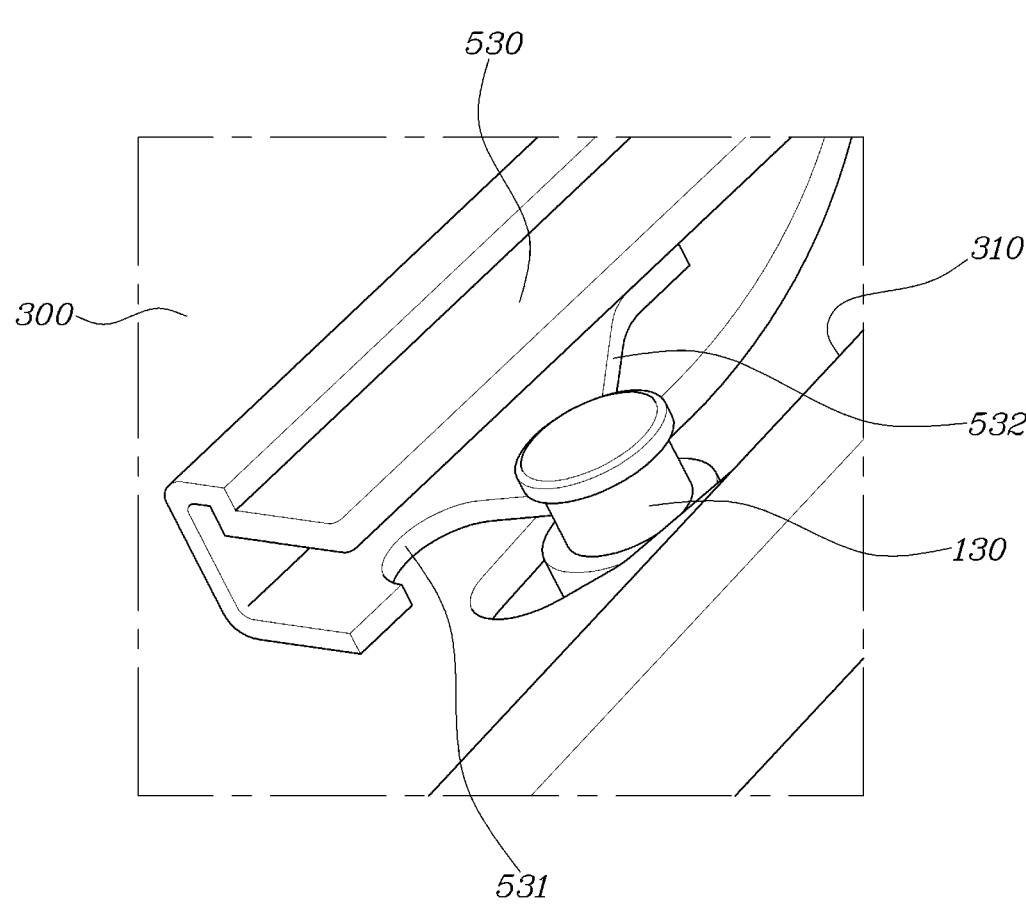
Figure 18:
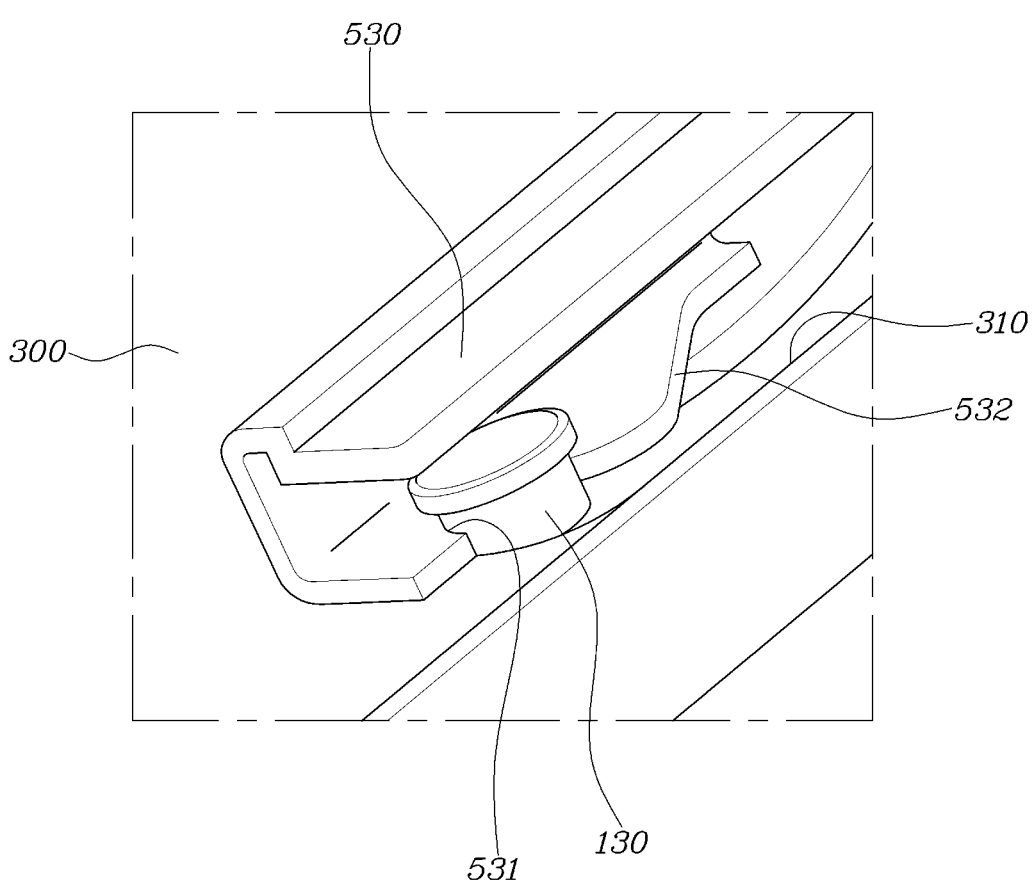

FIGS. 16 to 18 illustrate a process in which, when the locking protrusion 130 moves to the other end of the slot hole 310 along the slot hole 310 in a case in which the mode of the cushion part 100 is changed to the tip-up mode, the locking protrusion 130 smoothly moves over the second inclined surface 532 formed on the second extension part 530 of the latch 500 and is fitted and fixed into the second latch groove 531.

The locking apparatus according to embodiments of the present disclosure may further include a latch handle 600 rotatably coupled to the cushion part 100 and a latch cable 700 configured to connect the latch handle 600 and the latch 500 to each other and configured to rotate the latch 500 by a pulling force as the latch cable 700 is pulled toward the latch handle 600 when a user rotates the latch handle 600.

The latch handle 600 is coupled to the bottom of the front of the cushion part 100 with a rotatable structure, is rotated with respect to the cushion part 100 when being operated by the user, pulls the latch cable 700 toward the latch handle 600 when being rotated by the user's operation, and returns to the initial state before the operation by an elastic force of the spring when the user's operation force is removed.

Figure 11:
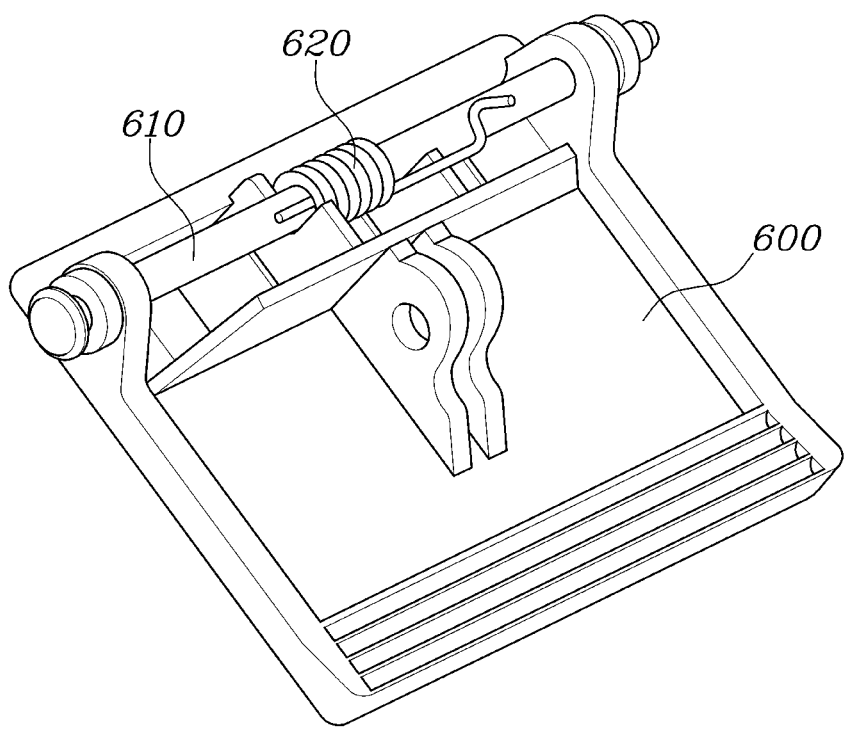
FIG. 11 is a view explaining a latch handle of embodiments of the present disclosure.

Referring to FIG. 11, a hinge pin 610 coupled to the latch handle 600 may be coupled to the front of the cushion part 100, and the latch handle 600 may be coupled to the cushion part 100 with a rotatable structure around the hinge pin 610.

Figure 5:
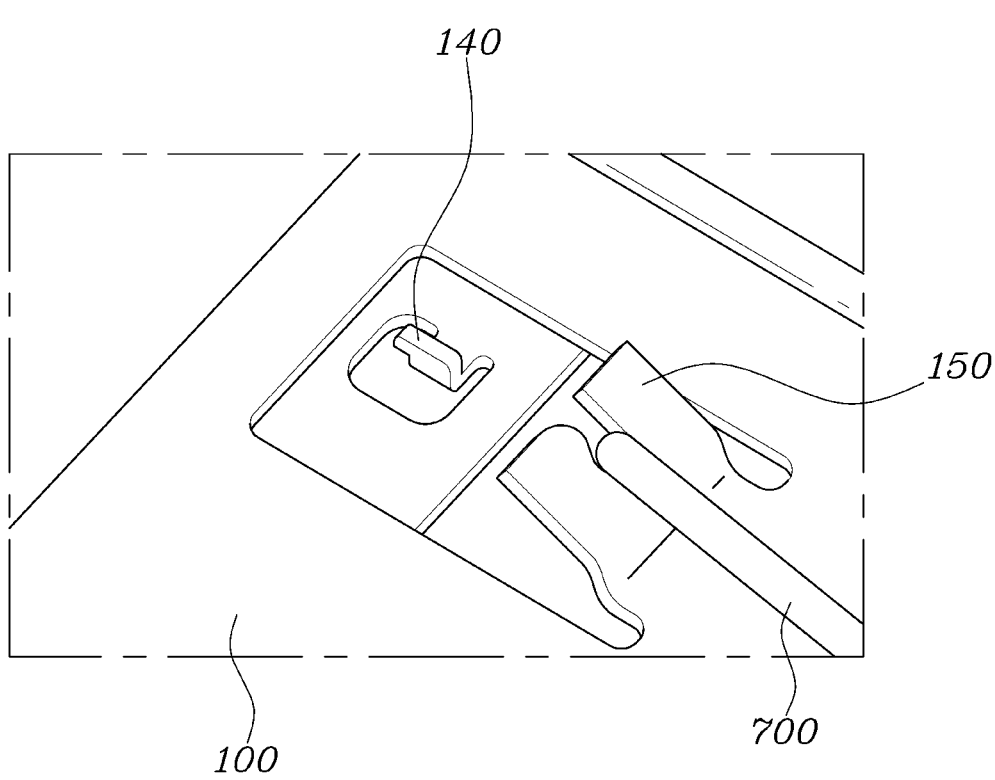

Further, a handle spring 620 is penetrated by the hinge pin 610, one end of the handle spring 620 may be supported by the latch handle 600, and as illustrated in FIG. 5, the other end of the handle spring 620 may be locked and fixed to a first spring hanger part 140 provided in front of the cushion part 100.

The handle spring 620 may include a torsion spring, but it is not limited thereto.

In the cushion part 100, a cable locking part 150 may be provided on one side of the first spring hanger part 140, and one end of the latch cable 700 connected toward the latch handle 600 may be locked and coupled to the cable locking part 150 so as to prevent the secession thereof.

The locking apparatus according to embodiments of the present disclosure may further include a latch spring 800 configured to connect the latch 500 and the side frame 300 to each other, to accumulate an elastic force with its length tensed when the latch 500 is rotated by the pulling force of the latch cable 700, and to return the latch 500 by the accumulated elastic force with its length restored when the pulling force of the latch cable 700 is released.

One end of the latch spring 800 may be connected to a specific region of the latch 500 rotatably installed around the latch fixing part 320 of the side frame 300, and the other end of the latch spring 800 may be locked and fixed to a second spring hanger part 330 provided at a location adjacent to the latch 500 on the side frame 300.

The latch spring 800 may include a coil spring, but it is not limited thereto.

FIGS. 1 to 3 illustrate the seating mode in which the cushion part 100 is rotated to protrude forward.

When the cushion part 100 is in the seating mode, the locking protrusion 130 may be fitted and fixed into the first latch groove 521 in a state of being located at one end of the slot hole 310, and accordingly, the location of the cushion part 100 may be fixed in the seating mode.

Figure 12:
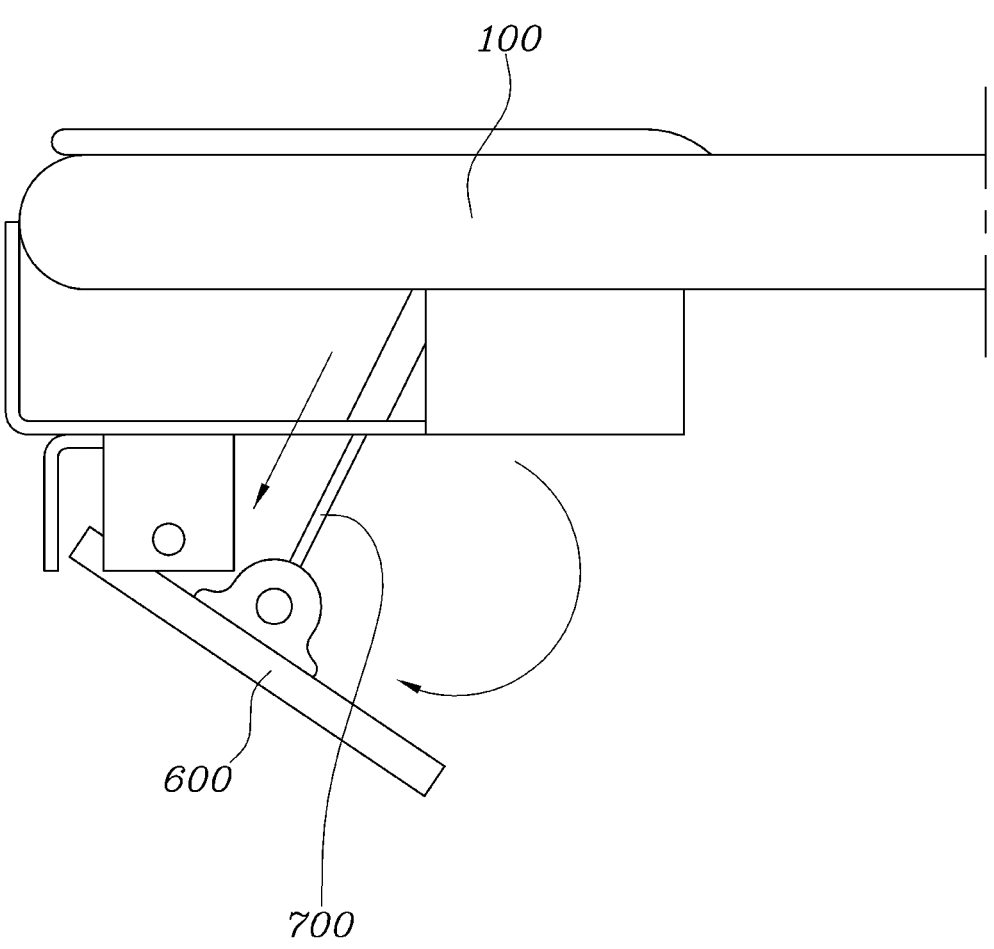
FIGS. 12 and 13 are views explaining an operation state of a latch when a latch handle is operated to change a cushion part state from a seating mode to a tip-up mode.
Figure 13:
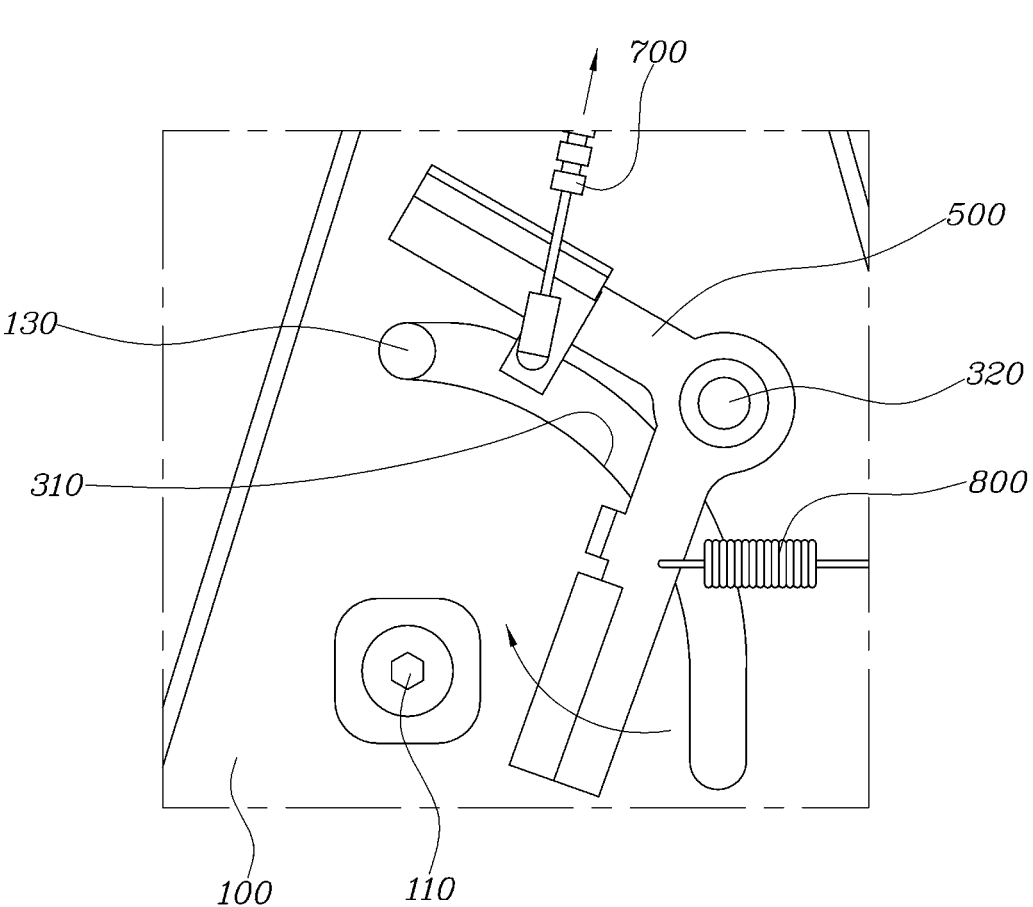

As in FIG. 12, if the user operates and rotates the latch handle 600 in the above-described seating mode, the latch cable 700 is pulled toward the latch handle 600 to cause the latch 500 to be rotated, and as the locking protrusion 130 gets out of the first latch groove 521 by the rotation of the latch 500, the locking of the cushion part 100 is released in the seating mode.

If the locking of the cushion part 100 is released in the seating mode, the user may rotate the cushion part 100 toward an upper side where the back part 200 is present, and in this case, the locking protrusion 130 moves toward the other end of the slot hole 310 along the slot hole 310 and is fitted and fixed into the second latch groove 531. Accordingly, as in FIGS. 14 and 15, the state of the cushion part 100 may be changed to the tip-up mode, and then the location of the cushion part 100 may be fixed.

Figure 19:
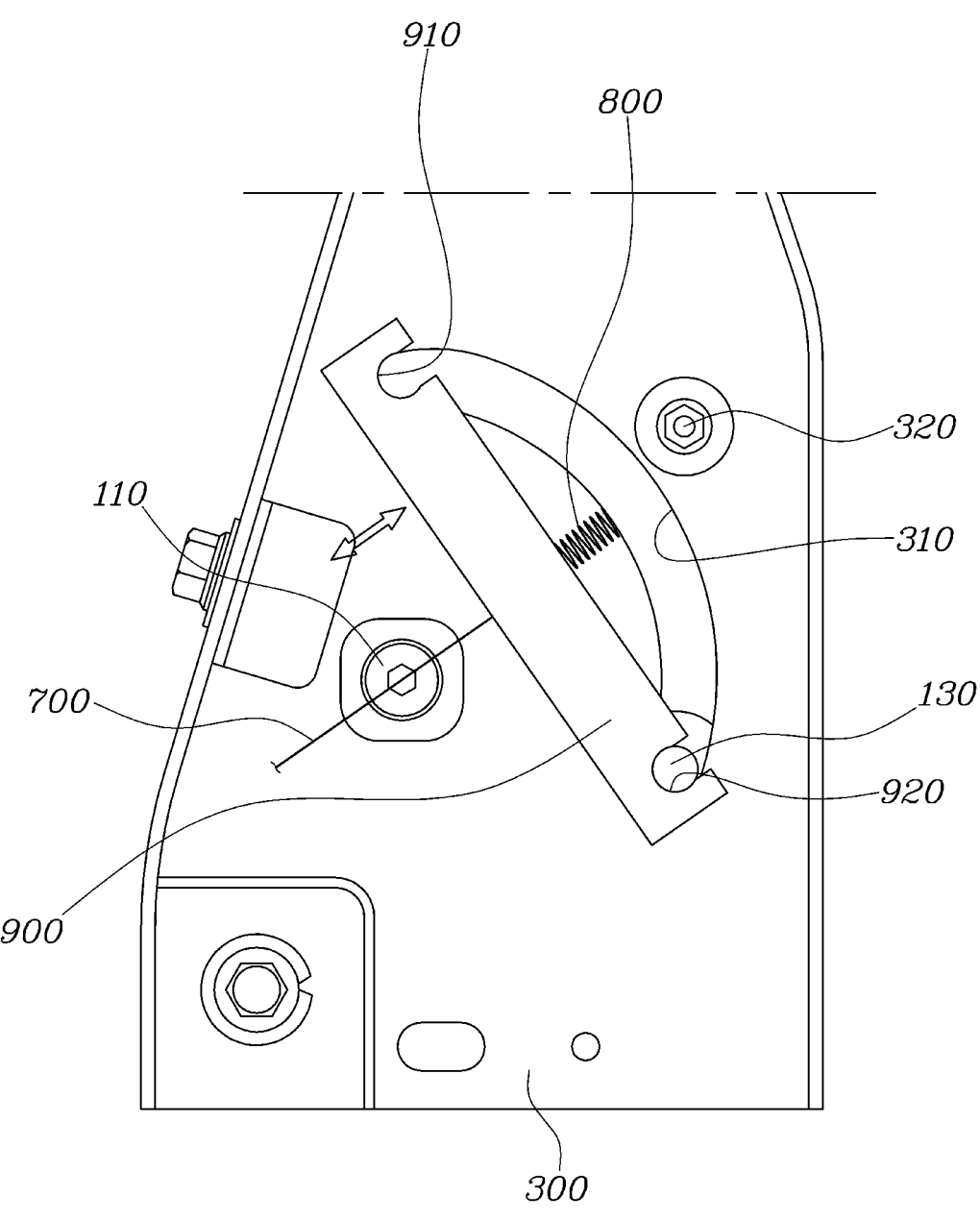
FIG. 19 is a view explaining another embodiment of a latch according to embodiments of the present disclosure.

FIG. 19 illustrates a latch 900 according to another embodiment of the present disclosure.

As illustrated, the latch 900 may be formed in a straight shape and may have one end and the other end at which a first latch groove 910 and a second latch groove 920 for inserting the locking protrusion 130 therein may be formed to be open in the same direction. The locking protrusion 130 is fitted and fixed into the first latch groove 910 in a state where the locking protrusion 130 is located at one end of the slot hole 310 when the cushion part 100 is in the seating mode, and the locking protrusion 130 may be fitted and fixed into the second latch groove 920 in a state where the locking protrusion 130 is located at the other end of the slot hole 310 when the cushion part 100 is in the tip-up mode.

On the latch 900, one end of the latch cable 700 and one end of the latch spring 800 may be connected to each other in opposite directions, and the other end of the latch spring 800 is connected to the side frame 300, and the latch cable 700 may be connected to the side frame 300.

If the latch cable 700 is pulled through the rotation of the latch handle 600 by the user operation, the straight-shaped latch 900 moves in a straight line in the pulling direction of the latch cable 700, whereas if a user operation force is released from the latch handle 600, the latch 900 moves in a straight line in an opposite direction by an elastic force of the latch spring 800 and returns to its initial location.

As described above, the locking apparatus for a vehicle seat according to embodiments of the present disclosure is configured to be able to lock all of the cushion part 100 in the seating mode and the cushion part 100 in the tip-up mode by utilizing the bi-directionally lockable latch 500 on the seat of the cushion part tip-up structure, and through this, it is possible to seek the reduction of the number of components, the weight reduction, and the cost reduction of the locking apparatus.

Although specific embodiments of the present disclosure have been illustrated and described for illustrative purposes, those of ordinary skill in the art will appreciate that various modifications and corrections are possible without departing from the technical idea of the present disclosure provided by the appended claims below.

What is claimed is:

1. A locking apparatus for a seat, the locking apparatus comprising:
   a side frame rotatably coupled to a rear end of a cushion part and having an arc-shaped slot hole disposed thereon along a turning radius of the cushion part;
   a locking protrusion disposed on the cushion part, fitted into the slot hole, and configured to move along the slot hole in a state in which the cushion part is rotated to be changed to a seating mode or a tip-up mode; and
   a latch rotatably coupled to the side frame and configured to be locked and fixed by the locking protrusion in a state in which the cushion part is in the seating mode or the tip-up mode,
   wherein the latch comprises:
   a body part rotatably coupled to a latch fixing part disposed on the side frame;
   a first extension part extending in a first direction from the body part and having a first end part on which a first latch groove configured to fix the locking protrusion is disposed; and
   a second extension part extending in a second direction from the body part, opposite the first direction, and having a second end part on which a second latch groove configured to fix the locking protrusion is disposed.

2. The locking apparatus of claim 1, wherein:
the latch comprises a single component;

the locking protrusion is configured to be locked in and fixed to a first end of the latch in the state in which the cushion part is in the seating mode; and the locking protrusion is configured to be locked in and fixed to a second end of the latch in the state in which the cushion part is in the tip-up mode.

3. The locking apparatus of claim 1, wherein:

the body part is rotatably coupled to the side frame around the latch fixing part between a first end and a second end of the slot hole; and the first latch groove and the second latch groove are disposed to match the first end and the second end of the slot hole, respectively.

4. The locking apparatus of claim 1, wherein in the state in which the cushion part is in the seating mode, the locking protrusion is fitted and fixed into the first latch groove in a state where the locking protrusion is located at a first end of the slot hole.

5. The locking apparatus of claim 4, wherein in the state in which the cushion part is in the tip-up mode, the locking protrusion is fitted and fixed into the second latch groove in a state where the locking protrusion is located at a second end of the slot hole.

6. The locking apparatus of claim 1, wherein:

an outer surface of the first latch groove is disposed as a first inclined surface; and in a state in which the locking protrusion moves to a first end of the slot hole, the locking protrusion moves over the first inclined surface and is fitted into the first latch groove.

7. The locking apparatus of claim 6, wherein:

an outer surface of the second latch groove is disposed as a second inclined surface; and in a state in which the locking protrusion moves to a second end of the slot hole, the locking protrusion moves over the second inclined surface and is fitted into the second latch groove.

8. The locking apparatus of claim 1, wherein the first latch groove and the second latch groove each have an outer surface disposed as an inclined surface configured to guide the locking protrusion into the respective latch groove as the locking protrusion moves along the slot hole.

9. A locking apparatus for a seat, the locking apparatus comprising:

a side frame rotatably coupled to a rear end of a cushion part and having an arc-shaped slot hole disposed thereon along a turning radius of the cushion part;

a locking protrusion disposed on the cushion part, fitted into the slot hole, and configured to move along the slot hole in a state in which the cushion part is rotated to be changed to a seating mode or a tip-up mode; and a latch coupled to the side frame and configured to be locked and fixed by the locking protrusion in a state in which the cushion part is in the seating mode or the tip-up mode, wherein:

the latch is formed in a straight shape and has a first end and a second end at which a first latch groove and a second latch groove configured to receive the locking protrusion are respectively disposed to be open in a same direction;

the locking protrusion is fitted and fixed into the first latch groove in a state where the locking protrusion is located at a first end of the slot hole in the state in which the cushion part is in the seating mode; and the locking protrusion is fitted and fixed into the second latch groove in a state where the locking protrusion is located at a second end of the slot hole in the state in which the cushion part is in the tip-up mode.

10. The locking apparatus of claim 9, wherein:

a first end of a latch cable and a first end of a latch spring are connected to each other in opposite directions on the latch;

a second end of the latch cable is connected to a latch handle coupled to the cushion part;

a second end of the latch spring is connected to the side frame; and in a state in which the latch cable is pulled through a rotation of the latch handle, the latch is configured to move in a straight line in a pulling direction of the latch cable, and in a state in which a rotation force is released from the latch handle, the latch is configured to move in the straight line in an opposite direction by an elastic force of the latch spring and return to an initial location.

11. The locking apparatus of claim 9, wherein the latch further comprises a latch spring configured to connect the latch and the side frame to each other, the latch spring being configured to accumulate an elastic force when the latch is moved from an initial position and to return the latch to the initial position by the accumulated elastic force.

12. A locking apparatus for a seat, the locking apparatus comprising:

a side frame rotatably coupled to a rear end of a cushion part and having an arc-shaped slot hole disposed thereon along a turning radius of the cushion part;

a locking protrusion disposed on the cushion part, fitted into the slot hole, and configured to move along the slot hole in a state in which the cushion part is rotated to be changed to a seating mode or a tip-up mode;

a latch rotatably coupled to the side frame and configured to be locked and fixed by the locking protrusion in a state in which the cushion part is in the seating mode or the tip-up mode;

a latch handle rotatably coupled to the cushion part; and a latch cable configured to connect the latch handle and the latch to each other and configured to rotate the latch by a pulling force as the latch cable is pulled toward the latch handle in a state in which the latch handle is rotated, wherein:

the latch is formed in a straight shape and has a first end and a second end at which a first latch groove and a second latch groove configured to receive the locking protrusion are respectively disposed to be open in a same direction;

the locking protrusion is fitted and fixed into the first latch groove in a state where the locking protrusion is located at a first end of the slot hole in the state in which the cushion part is in the seating mode; and the locking protrusion is fitted and fixed into the second latch groove in a state where the locking protrusion is located at a second end of the slot hole in the state in which the cushion part is in the tip-up mode.

13. The locking apparatus of claim 12, further comprising a latch spring configured to connect the latch and the side frame to each other, to accumulate an elastic force in a state in which the latch is rotated by the pulling force of the latch cable, and to return the latch by the accumulated elastic force in a state in which the pulling force of the latch cable is released.

14. The locking apparatus of claim 12, wherein:

a first end of the latch cable and a first end of a latch spring are connected to each other in opposite directions on the latch;

a second end of the latch cable is connected to a latch handle coupled to the cushion part;

a second end of the latch spring is connected to the side frame; and in a state in which the latch cable is pulled through a rotation of the latch handle, the latch is configured to move in a straight line in a pulling direction of the latch cable, and in a state in which a rotation force is released from the latch handle, the latch is configured to move in the straight line in an opposite direction by an elastic force of the latch spring and return to an initial location.

15. A vehicle comprising:

a vehicle body;

a vehicle seat disposed in the vehicle body and comprising a cushion part and a locking apparatus, the locking apparatus comprising:

a side frame rotatably coupled to a rear end of the cushion part and having an arc-shaped slot hole disposed thereon along a turning radius of the cushion part;

a locking protrusion disposed on the cushion part, fitted into the slot hole, and configured to move along the slot hole in a state in which the cushion part is rotated to be changed to a seating mode or a tip-up mode; and a latch rotatably coupled to the side frame and configured to be locked and fixed by the locking protrusion in a state in which the cushion part is in the seating mode or the tip-up mode, wherein the latch comprises:

a body part rotatably coupled to a latch fixing part disposed on the side frame;

a first extension part extending in a first direction from the body part and having a first end part on which a first latch groove configured to fix the locking protrusion is disposed; and a second extension part extending in a second direction from the body part, opposite the first direction, and having a second end part on which a second latch groove configured to fix the locking protrusion is disposed.

16. The vehicle of claim 15, wherein:

the latch comprises a single component;

the locking protrusion is configured to be locked in and fixed to a first end of the latch in the state in which the cushion part is in the seating mode; and the locking protrusion is configured to be locked in and fixed to a second end of the latch in the state in which the cushion part is in the tip-up mode.

17. The vehicle of claim 15, wherein:

the body part is rotatably coupled to the side frame around the latch fixing part between a first end and a second end of the slot hole; and the first latch groove and the second latch groove are disposed to match the first end and the second end of the slot hole, respectively.

18. The vehicle of claim 15, wherein:

in the state in which the cushion part is in the seating mode, the locking protrusion is fitted and fixed into the first latch groove in a state where the locking protrusion is located at a first end of the slot hole; and in the state in which the cushion part is in the tip-up mode, the locking protrusion is fitted and fixed into the second latch groove in a state where the locking protrusion is located at a second end of the slot hole.

19. The vehicle of claim 15, wherein:

an outer surface of the first latch groove is disposed as a first inclined surface;

in a state in which the locking protrusion moves to a first end of the slot hole, the locking protrusion moves over the first inclined surface and is fitted into the first latch groove;

an outer surface of the second latch groove is disposed as a second inclined surface; and in a state in which the locking protrusion moves to a second end of the slot hole, the locking protrusion moves over the second inclined surface and is fitted into the second latch groove.

20. The vehicle of claim 15, wherein the locking apparatus further comprises a latch handle rotatably coupled to the cushion part and a latch cable configured to connect the latch handle and the latch to each other, wherein the latch cable is configured to rotate the latch by a pulling force as the latch cable is pulled toward the latch handle when the latch handle is rotated.

* * * * *